United States Patent [19]

Gurries

[11] 4,385,014
[45] May 24, 1983

[54] RESONANTLY-POWERED PRESS

[75] Inventor: Raymond A. Gurries, Reno, Nev.

[73] Assignee: Resonant Technology Co., Sparks, Nev.

[21] Appl. No.: 313,099

[22] Filed: Oct. 20, 1981

[51] Int. Cl.³ .............................................. B29C 3/00
[52] U.S. Cl. ...................................... 264/23; 264/71; 425/174.2; 425/421; 425/432
[58] Field of Search ................. 264/23, 71; 425/174.2, 425/421, 432

[56] References Cited

U.S. PATENT DOCUMENTS

| | | | |
|---|---|---|---|
| 3,468,001 | 9/1969 | Bodine | 425/174.2 X |
| 3,635,609 | 1/1972 | Balamuth | 425/174.2 X |
| 3,717,427 | 2/1973 | Bodine | 425/432 X |
| 3,752,620 | 8/1973 | Renoux | 425/174.2 |
| 4,042,659 | 8/1977 | Botting et al. | 264/71 |
| 4,094,941 | 6/1978 | Manners et al. | 264/71 |

*Primary Examiner*—J. Howard Flint, Jr.
*Attorney, Agent, or Firm*—Townsend and Townsend

[57] ABSTRACT

A press for applying impact forces to a work object includes a horizontal resonant beam having an output end for applying the impact forces. The beam is secured to a frame at two nodal points, one of which may be moved up and down by a hydraulic cylinder. The beam is excited by an eccentric weight oscillator and the output end of the beam is urged against the work object by the cylinder. In operation, the force applied by the cylinder to the beam should be maintained less than the oscillator force so that the output end of the beam does not freeze against the work object, causing the beam to enter a forced resonant mode.

14 Claims, 9 Drawing Figures

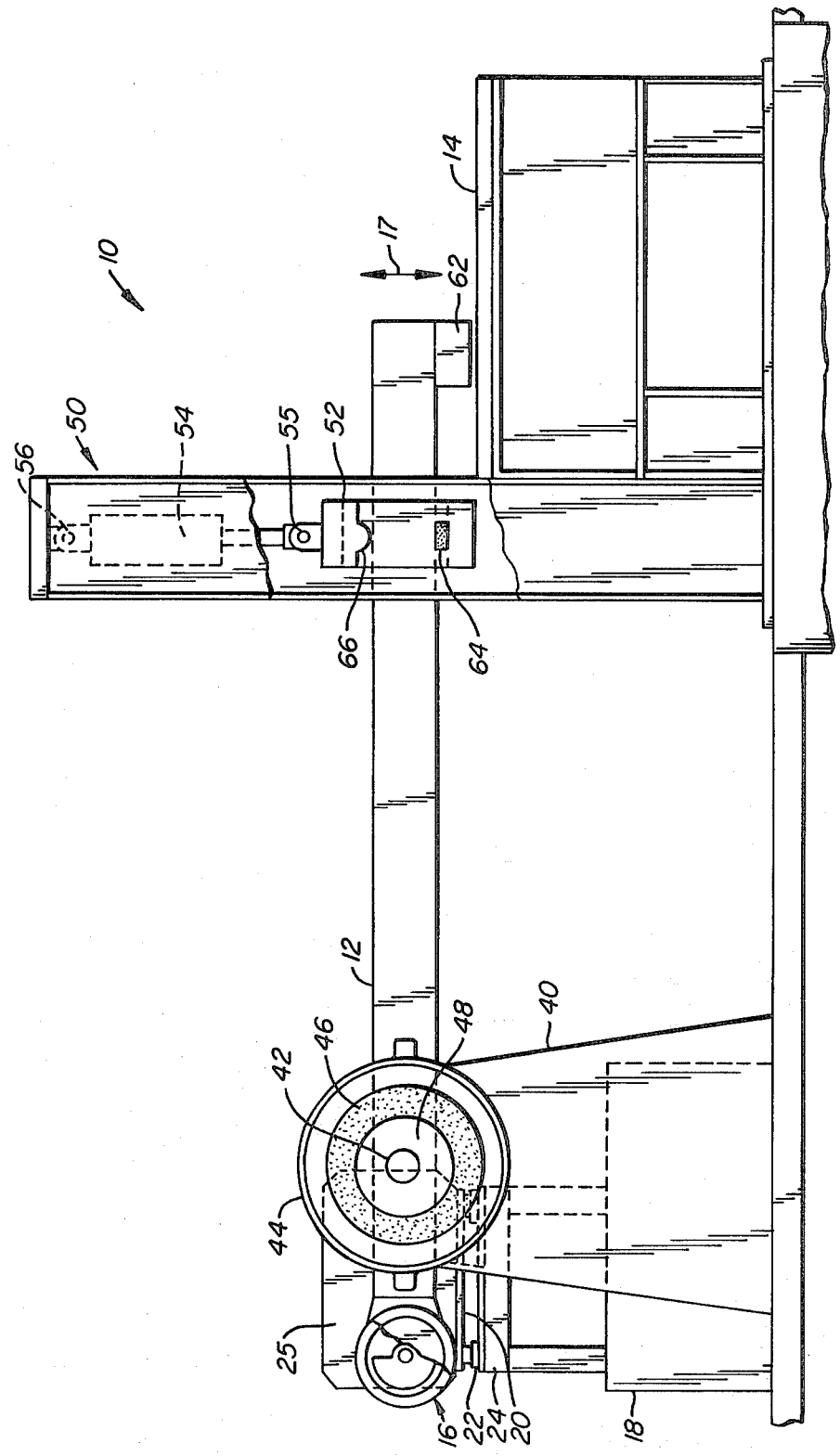
FIG._1.

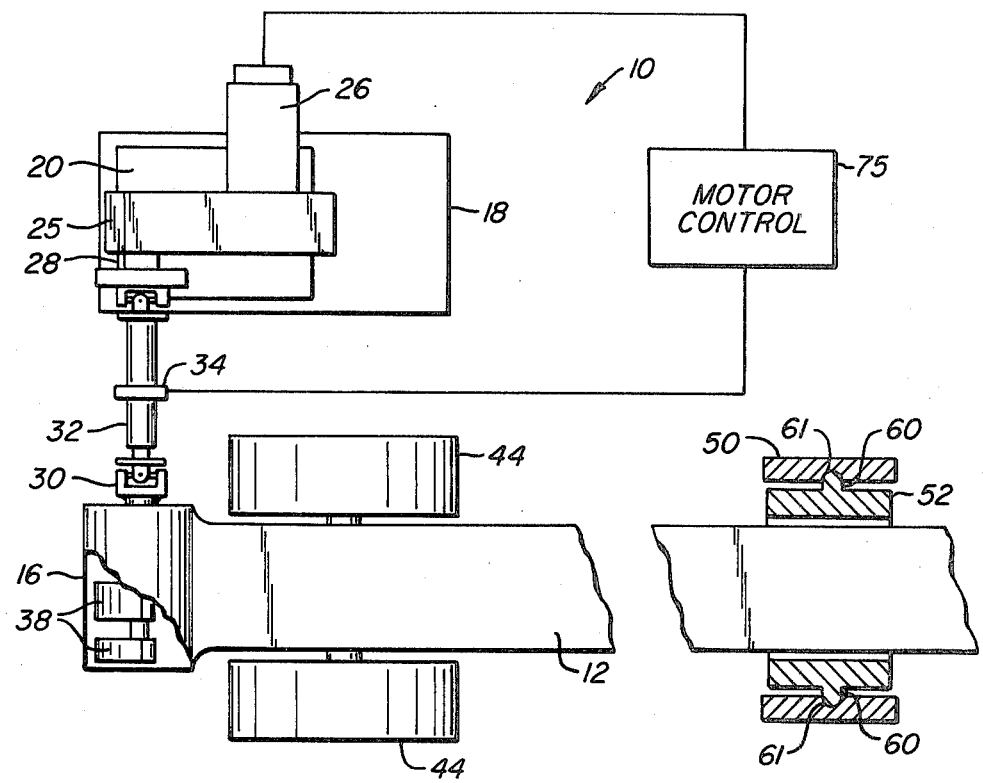
FIG._2.
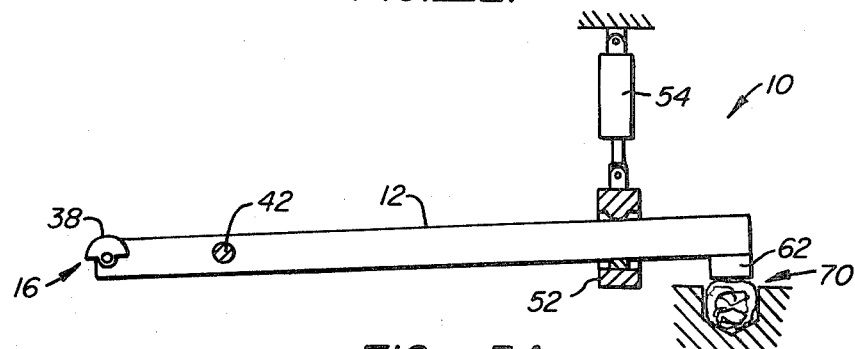
FIG._3A.
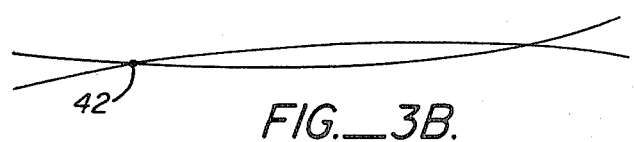
FIG._3B.

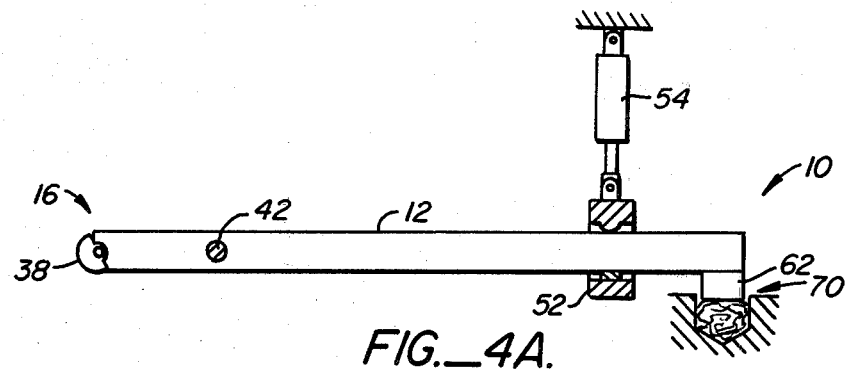
FIG._4A.
FIG._4B.
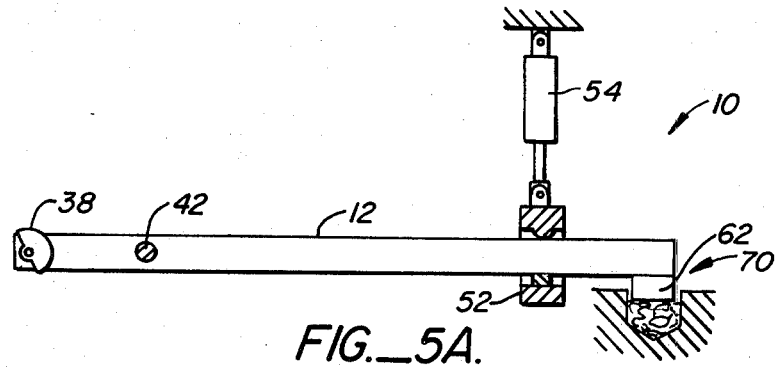
FIG._5A.
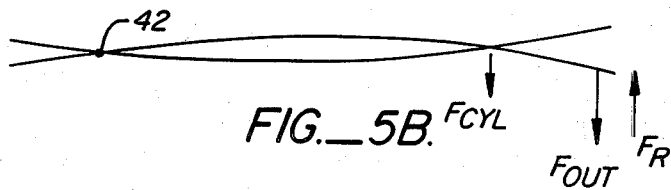
FIG._5B.
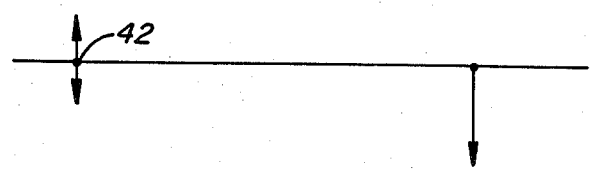
FIG._5C.

RESONANTLY-POWERED PRESS

BACKGROUND OF THE INVENTION

1. Field of the Invention

The present invention relates generally to a press and a method of operating the press to apply impact forces to a work object. More particularly, the invention relates to a resonantly-powered press and a method of operating the press to sustain resonance even when the press experiences very high reaction forces resulting from compaction of the work object.

Various work-performing apparatus require the application of impact and/or compressive forces to a work object in order to bring about some desired physical change in the work object. Typical of such apparatus are impact forges, compressive dies, and the like.

2. Description of the Prior Art

U.S. Pat. No. 3,717,427 describes an apparatus for plasticizing a charge of particulate plastic material by subjecting the material to pressure pulses exerted by a resonantly-excited beam. The beam is horizontally mounted at a fixed elevation by pair of posts attached to its nodes. The center anti-node reciprocates a plunger in an otherwise sealed chamber to apply the pressure pulses. A constant biasing pressure may be provided by the support for the housing which may be urged upward toward the piston.

SUMMARY OF THE INVENTION

The present invention is a press for applying impact forces to a work object, typically an impact forge, a compressive die, and the like. The apparatus includes a resonant beam which is supported substantially horizontally by a frame. The beam, when resonantly excited, displays an anti-node at each end and at least one additional anti-node therebetween. Intermediate each adjacent pair of anti-nodes will be a node, which is a point of zero lateral displacement. The beam will be rotatably secured to frame at a first node referred to hereinafter as the fixed node so that the beam may be resonantly driven without substantial impedance from the frame. The beam will be further supported at a second node (referred to hereinafter as the free node) in a manner so that the beam may be raised and lowered about an axis defined by the fixed support.

A means for applying vibrations to the resonant beam, typically an eccentric weight oscillator, is provided at a first anti-node, (input anti-node) typically one of the terminal anti-nodes which are more accessible. A second anti-node, typically the other terminal anti-node, will act as the output of the beam to apply the impact force to the work object.

Finally, a means is provided to apply a biasing force to one of the nodes to urge the output against the work object. In addition to providing a basal pressure, such a force is necessary to prevent the reaction forces (resulting from the output of the beam striking the work object) from causing the beam to bounce away from the work object. Typically, such means will be part of the support assembly provided for the second node.

A particular advantage of the present invention results from the efficient transfer of energy arising from the use of a resonant system. Since a greater percent of the input energy is transferred to the material being plasticized, less energy is consumed by the press and more economic operation results.

In operation, resonance will typically be induced in the beam prior to contacting the output anti-node with the work object. After resonance has commenced, the output may be lowered until contact is achieved. Then depending on the particular application, a preselected force may be applied to the vertically adjustable node to perform the desired work. The pressure applied to the work object is combination of both the downward force applied to the beam and the weight of the beam.

A problem can arise when the downward force applied to the adjustable node approaches the oscillator input force. So long as the downward force applied to the node of the beam remains substantially less than such input force the beam can continue to vibrate in a standing lateral wave. As the downward force approaches the input force exerted by the oscillator, however, the beam output becomes fixed against the work object and is no longer free to oscillate relative to the free node. With the beam unable to resonate, substantial vibrations and stress will be imparted to the frame. This mode of operation, typically referred to as forced vibration, is highly undesirable and can result in catastrophic failure of the press.

The method of the present invention for operating a resonant press therefore requires that the net downward force applied to the beam (i.e. the sum of the weight of the beam and the force applied by the free node support) be limited to an amount less than that which would cause forced vibration. It is preferred that the net downward force be limited to less than the amount of force input by the oscillator.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side elevational view with portions being broken away of a press incorporating the principles of the present invention.

FIG. 2 is a top plan view of a part of the press of FIG. 1.

FIGS. 3A, 3B, 4A, 4B, 5A, 5B, and 5C are shcematic representations of the resonant beams and forces acting on the resonant beam, at various points during the operational cycle.

DESCRIPTION OF THE PREFERRED EMBODIMENT

In FIGS. 1 and 2, a press 10 includes an elongate resonant beam 12 mounted in a support frame, and a work table 14 lying on the floor. A die, compression mold, or other work object to be compressed is supported on table 14. Resonant beam 12 has a vibratory input at one end (anti-node), an output at the other end (anti-node) which is vibratory in first and second opposite vertical directions represented by an arrow BA in FIG. 1 responsive to vibrations at the input, and a pair of spaced apart nodes between the input and the output.

An oscillator 16, which has a housing formed in a one-piece construction with beam 12, is coupled to the input anti-node of the resonant beam 12. A support table 18 lies on the floor adjacent to oscillator 16. A platform 20 (FIG. 1) is coupled by vibration oscillators 22 to the top surface of a pedestal 24 on table 18. A power transmission housing 25 is supported by platform 20. A hydraulic motor 26 (FIG. 2) is mounted on the side of the housing 24. Motor 26 is coupled by a power transmission within housing 24 to a drive shaft 28. Oscillator 16 has a shaft 30 to which drive shaft 28 is connected by shaft 32. A tachometer 34 circumscribes shaft 32 to determine its rotational velocity. Oscillator 16 includes a plurality of removable and replaceable eccentric weights 38 mounted on shaft 30. Resonant beam 12 is pivotally carried by a stationary frame 40 (FIG. 1) lying on the floor.

A shaft 42 is press fitted into a horizontal bore extending through resonant beam 12 transverse to its length at its effective node nearest to oscillator 16. The location of this effective node is a function of the operating frequency of oscillator 16.

A pair of cylindrical housings 44 are attached to frame 40 on either side of resonant beam 12 in concentric relationship with shaft 42. A pair of annular resilient members 46 in the form of pneumatic rubber tires are located inside the respective cylindrical housings 44. Annular resilient members 46 are mounted on pairs of central hubs 48 which are in turn mounted on the ends of shaft 42. Thus, resonant beam 12 is supported by shaft 42 and is pivotable about the axis of the shaft.

A frame 50, which lies on the floor, embraces resonant beam 12 at its effective node nearest the output anti-node of the resonant system. A movable rectangular carrier 52 surrounds resonant beam 12 within frame 50. The body of hydraulic cylinder 54 is connected by a pin 56 to the top of frame 50 and the rod of cylinder 54 is connected by a pin 55 to the top of carrier 52. The sides of carrier 52 have rails 60 (FIG. 2) that ride in tracks 61 formed on the adjacent surfaces of the inside of frame 50 to guide carrier 52 vertically as the arm of cylinder 54 is extended and retracted.

The output anti-node of resonant beam 12 overlies table 14. A hammer 62 is secured to the lower surface of the output of resonant beam 12.

In operation, vibrational force is applied to the input anti-node of resonant beam 12 by oscillator 16 at an operating frequency below the resonant frequency of resonant beam 12. The amount of vibrational force necessary to achieve the desired output power is achieved by varying weights 38. An object to be compressed is placed on table 14 directly under hammer 62 and cylinder 54 is operated to lower carrier 52 until hammer 52 bears against the object to be compressed. Before hammer 62 contacts the object to be compressed, resonant beam 12 rests on resilient pad 64 at the effective node, which holds it against node support 66. After such contact, the reaction force of the object to be compressed exerted on hammer 62 forces resonant beam 12 against node support 66. Cylinder 54 applies a unidirectional downward force to beam 12 through node support 66. When the object is fully compressed, cylinder 54 is operated to lift carrier 52 so the compressed object can be removed and a new object to be compressed can be placed under hammer 62. Thereafter, the described cycle is repeated.

Referring now also to FIGS. 3–5, the operation of the press 10 will be described. A work object, such as a compressive die or an article to be impact forged, is placed on work table 14. For the purpose of illustration, a closed die 70 having an irregularly-shaped charge of feed material is illustrated. It is desired that the feed material be transformed to the shape of the die 70. The elevation of the output end of the resonant beam 12 may be adjusted by the cylinder 54. Typically, before starting the oscillator 16 the beam 12 will be raised above the work object, as shown in FIG. 3A, so that the output anti-node is clear of the material in the die 70. Thus, when the oscillator 16 is started, the beam 12 will be free to vibrate in its natural pattern, as illustrated in FIG. 3B.

The eccentric weights 38 of oscillator 16 are driven by the hydraulic motor 26 at a frequency which is near, but typically less than the "free-ringing" resonant frequency of the beam 12. The free-ringing resonant frequency is that frequency at which the beam 12, if initially stimulated, will thereafter vibrate without further excitation. The beam 12 may be caused to vibrate at frequencies other than the free-ringing frequency by continuously driving the beam, such as with oscillator 16. The vibration pattern will be similar to that of the free-ringing mode, except that the location of the nodes and anti-nodes will deviate somewhat.

In the apparatus of the present invention, the location of both the shaft 42 and the carrier 52 are chosen to lie at the nodal positions for the particular drive frequency. Thus, before the output anti-node of the beam is brought into contact with the work object, the beam 12 will display a standing lateral wave pattern, also referred to as an S-shaped wave, and the hammer 62 will be reciprocating up and down as indicated by arrow A in FIG. 1.

As the beam is lowered onto the material in the die 70 by cylinder 54, the work object will exert periodic reaction forces $F_R$ in a direction opposite to the applied force of the output end, i.e., in an upward direction, as illustrated in FIGS. 4A and 4B. The magnitude of the reaction force $F_R$ will depend on the vibratory force input by the eccentric weights 38, the weight of the beams, and the force applied by the cylinder 54. Typically, as soon as the hammer 62 begins to strike the material, the cylinder 54 must apply a downward force $F_{CYL}$ to prevent the reaction force $F_R$ from driving the beam 12 upward.

Initially, the force $F_{OUT}$ applied by the hammer 62 will result in a substantially "inelastic" collision between the hammer and the material as the shape of the material is altered by the impact force. Thus, the magnitude of $F_R$ will initially be small. After a time, however, the material will become compressed and, in some cases, the interaction between the output 62 and the object will become "inelastic". As that occurs, the reaction force $F_R$ approaches the force input from the oscillator and the hammer 62 will tend to bounce back after striking the compressed material.

As the output of the beam 12 encounters resistance, the resonant characteristics will be affected. Particularly, the vibration frequency of the beam 12 will be slowed and the location of the nodes will begin to wander. Shifting of the nodal support points is undesirable since the supports begin to experience excessive vibration. The shifting, however, can be limited, and often eliminated entirely, by providing a motor control unit 75 (FIG. 2) which increases the power output of the motor 26 when it senses (through tachometer 34) that the frequency of the motor is slowing.

Referring now to FIGS. 5A–5C, as the material in the die 70 becomes fully compressed the hammer 62 on the beam 12 has no more room to reciprocate. The reaction force $F_R$ exerted on the output end 62 approaches the magnitude of the output force $F_{OUT}$ and the output end of the beam will be forced upward. As illustrated in FIG. 5B, so long as the cylinder force $F_{CYL}$ does not exceed the reaction force $F_R$, the beam 12 will continue oscillating in its S-shaped pattern with the output node being driven upward by the reaction force $F_R$. The hammer 62 will continue to strike the material in the die 70 and bounce back therefrom so that the neutral position of the beam 72 is inclined slightly upward.

If, however, the cylinder force $F_{CYL}$ tending to rotate the beam 12 downward exceeds the moment of the reaction force $F_R$ tending to rotate the beam 12 upward about its fixed nodal point 42, the hammer 62 will become fixed against the die 70, as illustrated in FIG. 5C. Moreover, the cylinder node will also be fixed by the cylinder force $F_{CYL}$ and the beam 12 will be effectively fixed at three points and vibration will be severely restricted. The force imparted by the oscillator 16 will be absorbed by various parts of the system, causing great stress and almost certainly damaging the press 10.

The exact limit on the cylinder force $F_{CYL}$ depends on the reaction force $F_R$, which in turn depends on the force input by the oscillator 16. While the exact relationship among the various forces depends on the particular system, it is clear that the reaction force $F_R$ will always be less than the input force of the oscillator 16. For that reason, the cylinder force $F_{CYL}$ should always be maintained less than the force exerted by the oscillator 16 (that is, the centrifugal force exerted by the eccentric weights 38). It is desirable that the cylinder force $F_{CYL}$ be maintained substantially below the input force from the oscillator 16 preferably below one-half the magnitude of the oscillator force.

While the preferred embodiment of the present invention is illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. A press for applying an impact force to a work object, said press comprising:
    a frame;
    a resonant beam having an input, an output responsive to lateral vibrations applied to the input, and at least two nodes, said beam being mounted on the frame at the first of said nodes;
    means for applying vibrations to the input to induce a lateral wave in the beam;
    means for supporting the beam substantially horizontally and
    means for applying a force to a second of the nodes so that the output may be urged against the work object.

2. A press as in claim 1, wherein the means for supporting the beam and the means for applying a force to the beam together comprise a dual-acting hydraulic cylinder having an extendable rod engaging the beam substantially at the second node thereof so that the beam may be moved relative to the work object.

3. A press as in claim 1, wherein the means for applying vibrations to the input of the beams comprises one or more eccentric weights mounted substantially at an anti-node of the beam and means for rotating said eccentric weight(s) at a predetermined frequency.

4. A press as in claim 3, wherein the eccentric weight(s) are mounted on a shaft located substantially at the terminal anti-node of the beam and wherein the output of the beam lies at the opposite terminal anti-node.

5. A press as in claim 1, wherein the work object is a closed die.

6. A resonantly-driven press for applying impact forces to a work object, said press comprising:
    a frame;
    a resonant beam having a support shaft located substantially at a first nodal point, said support shaft being mounted on the frame;
    a supporting bracket engaging the beam substantially at a second nodal point;
    means for adjustably securing the supporting bracket to the frame so that an output end of the beam may be moved upward or downward; and
    means for resonantly exciting the resonant beam to cause the output end of the beam to vibrate.

7. A press as in claim 6, wherein the shaft is mounted on the frame in a resilient member so that vibration occurring at the first node is isolated from the frame.

8. A press as in claim 6, further comprising a motor controller which adjusts the power to the motor to maintain a preselected motor frequency regardless of load on the press.

9. A press as in claim 6, wherein the means for adjustably securing the supporting bracket to the frame is a hydraulic cylinder suspended from the frame above the beam.

10. A press as in claim 6, wherein the means for resonantly exciting the beam comprises:
    a shaft rotatably mounted substantially at an anti-node of the beam;
    at least one eccentric weight mounted on the shaft so as to rotate therewith; and
    a motor connected to rotate the shaft at a predetermined frequency.

11. A method for operating the press of claim 1, said method comprising;
    placing the work object adjacent the output of the beam;
    applying a vibratory force to the input of the beam so that the output reciprocates; and
    applying a force to the second node so that said output is urged against the work object, the magnitude of said force not exceeding the magnitude of the vibratory force applied to the input.

12. A method as in claim 11, wherein the magnitude of the force applied to the second node does not exceed one-half the magnitude of the vibratory force.

13. A method for applying an impact force against a work object including a resonant system including:
    a frame;
    a resonant beam having an input, an output responsive to vibrations at the input, and at least two nodes intermediate said input and output, said beam being mounted on the frame at a first of said nodes;
    means for applying vibrations to the input of the beam to induce a lateral wave in the beams; and
    means for applying a force to a second node so that the output is urged against the work object;
    said method comprising limiting the force applied to the second node to less than the vibrational force applied to the input so that the beam is prevented from entering a forced resonant mode.

14. An improved method as in claim 13, wherein the force applied to the second node is limited to less than one-half the force applied to the input.

* * * * *